United States Patent [19]

Nelson

[11] Patent Number: 4,691,774
[45] Date of Patent: Sep. 8, 1987

[54] NOVEL FERROFLUIDS FOR USE IN CEMENTING WELLS

[75] Inventor: Erik B. Nelson, Broken Arrow, Okla.

[73] Assignee: Dowell Schlumberger Incorporated, Tulsa, Okla.

[21] Appl. No.: 798,527

[22] Filed: Nov. 15, 1985

[51] Int. Cl.$^4$ ............................................. E21B 33/16
[52] U.S. Cl. ..................... 166/291; 106/90; 166/293
[58] Field of Search ............ 166/66.5, 291, 292, 166/293, 312; 106/90, 97

[56] References Cited

U.S. PATENT DOCUMENTS

| | | |
|---|---|---|
| 1,834,898 | 12/1931 | Boyajian . |
| 2,292,838 | 8/1942 | Jones . |
| 4,093,028 | 6/1978 | Brandon .................... 166/291 X |
| 4,356,098 | 10/1982 | Chagnon ..................... 252/62.51 |
| 4,537,918 | 8/1985 | Parcevaux et al. ............... 523/130 |
| 4,579,173 | 4/1986 | Rosenweig et al. ............ 166/275 X |

FOREIGN PATENT DOCUMENTS

| | | |
|---|---|---|
| 2027421 | 2/1980 | United Kingdom . |
| 294928 | 3/1971 | U.S.S.R. ..................... 166/292 |
| 641074 | 1/1979 | U.S.S.R. ..................... 166/292 |
| 1121394 | 11/1983 | U.S.S.R. ..................... 166/292 |

*Primary Examiner*—George A. Suchfield
*Attorney, Agent, or Firm*—L. Wayne White

[57] ABSTRACT

Novel cementitious and non-cementitious ferrofluids are disclosed which have properties making them suitable for use in cementing wells. The cementitious fluids comprise: (a) a hydraulic cement, (b) finely divided magnetic particles, (c) a bonding agent or a surfactant, and (d) a liquid medium. The binding agent or surfactant is present in the compositions in an amount sufficient to render the compositions stable in a magnetic field. When used in cementing wells, the cementitious ferrofluids are implaced in the annulus separating a casing from the formation in a wellbore by conventional techniques and the slurry is subsequently subjected to an activating magnetic field that causes movement of the magnetic particles in the slurry. The non-cementitious ferrofluids comprise: (a) finely divided magnetic particles, (b) stabilizing agent, and (c) a liquid medium. The movement of the magnetic particles results in a "scrubbing" action against the surface of the casing and the formation and a mixing of the slurry which helps displace any residual drilling mud. The net result is better bonding of the cement.

3 Claims, No Drawings

NOVEL FERROFLUIDS FOR USE IN CEMENTING WELLS

BACKGROUND OF THE INVENTION

I. Field of the Invention

This invention pertains to novel cementitious and non-cementitious ferrofluids having properties which make them useful in cementing wells. This invention is more specifically related to cementitious ferrofluids and a proces of using such fluids in cementing oil wells.

II. Technology Review

A variety of compositions have been described as stable ferrofluids and a wide variety of cementitious compositions have been used in known processes for cementing wells. However, the two fields of technology are essentially unrelated.

U.S. Pat. No. 4,356,098 (Chagnon) is a reference in the ferrofluid technology which describes certain stable ferrofluid compositions and a method of making same. Chagnon indicates that ferrofluids are ferromagnetic liquids which typically comprise a colloidal dispersion of finely-divided magnetic particles, such as iron, gamma-$Fe_2O_3$ (maghemite), $Fe_3O_4$ (magnetite) and combinations thereof, of subdomain size, such as, for example, 10 to 800 Angstroms, and more particularly 50 to 500 Angstroms, dispersed in a liquid through the use of a surfactant-type material. Chagnon states that typically ferrofluids are remarkably unaffected by the presence of applied magnetic fields or by other force fields in that the magnetic particles remain uniformly dispersed throughout the liquid carrier. Such ferrofluid compositions are widely known, and typical ferrofluid compositions are described, for example, in U.S. Pat. No. 3,764,540 and a process for making such materials is described in U.S. Pat. No. 3,917,538 and U.S. Pat. No. 4,019,994. Chagnon and the recited references therefore describe ferrofluids in which the only suspended particles are magnetic particles and the liquid medium is generally organic rather than aqueous.

The well cementing technology is replete with references to hydraulic cements and methods of using such cements in cementing wells. In this technology, cement slurries are used to fill the void space between the casing or pipe in the walls of the borehole penetrating a subterranean formation; a process called "well cementing" in the industry. In using such cement slurries, a line or string of pipe is inserted into the borehole and a cement slurry is pumped downwardly through the pipe into the bottom of the borehole and then upwardly along with outside of the casing or pipe displacing drilling mud from the annular space. The cement slurry is then displaced from the interior of the pipe before it hardens; this is normally accomplished by injecting a liquid medium behind the cement slurry and using it as a "hydraulic fluid" to force the remaining cement out of the pipe and into the annulus. In another but less common technique, the borehole is filled with the cement slurry and the pipe or casing (normally with the end sealed) is lowered into the hole. Cementing techniques are more fully described by D. K. Smith in "Cementing", Monograph Vol. IV, Henry L. Doherty Series, Society of Petroleum Engineers of AIME, New York (1976).

Well cementing operations place very rigorous demands upon the cement slurry, and a special area of technology has been developed to supply cements capable of meeting such demands. The person of ordinary skill in the art relating to the present invention is, therefore, one skilled in the formulation and use of cement slurries in well cementing.

The skilled artisan will recognize that additives to conventional cements and concretes used in the construction industry may or may not have applicability in cement slurries for well cementing. The conditions of use are sufficiently different that use in one area does not necessarily suggest use in the other. For example, styrene-butadiene latex had been used in cements and concretes in the construction industry for many years, but when formulated in an oil well cement slurry with certain fluid-loss additives, the resulting cement slurry proved unusually effective in preventing gas channelling. See U.S. Pat. No. 4,537,918 (Parcevaux et al.).

Channelling of gases upwardly through the setting cement slurry is one problem, but a similar "channelling" can occur if the cement slurry does not form a good bond with the casing and with the formation wall. If drilling mud is not uniformly and completely displaced from the annulus, a "microannulus" will form when the slurry fails to bond properly. Various techniques have been used but the most common commercial techniques used to combat this problem involve chemical washes or spacers and/or expansive cements. See, for example, U.S. Pat. No. 4,207,194 (Sharpe et al.) which illustrates the use of chemical washes and spacers. Such chemical washes are injected as a preflush ahead of the cement slurry and are thereby used to displace the drilling mud and "wash" the walls of the formation and casing before being contacted by the cement slurry. See also U.S. Pat. No. 4,328,036 (Nelson et al.) which illustrates the use of expansive cements. Another method utilizes sonic or energy-carrying waves to displace the drilling mud from the walls of the casing and formation. See U.S. Pat. No. 4,093,028 (Brandon). These methods work to a greater or lesser degree, but a need still exists for a method of removing the drilling mud from the casing and formation walls so as to promote better bonding of the cement slurry thereto. The drilling muds and cement slurries are typically incompatible, particularly when the drilling mud is an oil-base drilling mud.

SUMMARY OF THE INVENTION

A novel stable cementitious ferrofluid has now been discovered having properties suitable for use in cementing wells which comprises:
- (a) a hydraulic cement,
- (b) finely-divided magnetic particles,
- (c) a binding agent or a surfactant, and
- (d) a liquid medium. The binding agent or surfactant is present in such fluids in an amount sufficient to render the composition stable in a magnetic field. A novel process for cementing wells has also been discovered which comprises the steps of:
- (a) injecting the stable cementitious ferrofluid defined above into the wellbore annulus separating a casing and the walls of a subterranean formation, and
- (b) applying a magnetic field to cause a mechanical response (e.g., movement) of said ferrofluid in the annulus before the cement sets.

While Applicant does not wish to be bound by any specific theory, it is believed that the mechanical response of the ferrofluid can (a) help hold the cement slurry in place, (b) dislodge and displace any residual drilling fluid on the walls in the casing or formation, (c)

"stir" the cement mass in situ in the wellbore and thereby disperse and incorporate residual drilling mud and other contaminates into the cement slurry to form a more homogeneous mass and continuous hydraulic seal, and/or (d) "stir" the cement mass in situ in the wellbore to thereby minimize the static gel strength of the slurry which allows the cement column continue to exert a hydrostatic pressure against formation fluids and prevent channeling by such fluids; this, in turn, leads to better cement bonding and more effective hydraulic seal. Another process has also been discovered which is a method of preparing a well for cementing comprising:

(a) injecting into the wellbore annulus separating a casing and the walls of a subterranean formation a stable ferrofluid comprising an aqueous spacer or chemical wash containing finely divided magnetic particles, and (b) applying a magnetic field to cause a mechanical response of said ferrofluid in the annulus.

Of course, the combination of preparing the well for cementing and the new process for cementing the well using a stable cementitious ferrofluid represents a new and unique well cementing procedure. Also, a new improved well cementing procedure is provided when the process for preparing a well for cementing is followed by displacement of the stable ferrofluid spacer or chemical wash with a conventional hydraulic cement.

DETAILED DESCRIPTION OF THE INVENTION

The stable cementitious ferrofluids utilized herein comprise:

(a) a hydraulic cement.
(b) finely divided magnetic particles,
(c) a binding agent or a surfactant, and
(d) a liquid medium The hydraulic cements comprise a known class of materials, any member of which can be used herein. However, Portland cements are preferred and the Class G and Class H Portland cements are most preferred because of price and commercial availability. Other hydraulic cements include calcium aluminate cements (e.g., sold as Lumnite or Ciment Fondu), epoxy cements, silicone cements (geothermal cements), and the like.

The finely divided magnetic particles used in the present invention can be selected from the known class of magnetic materials, any member of which can be used so long as the material is essentially chemically inert in the stable ferrofluid composition. Such materials include, for example, magnetite, gamma-$Fe_2O_3$, chromium dioxide, cobalt-treated iron oxides, samarium cobalt alloys, and the like. Of these, magnetite and gamma-$Fe_2O_3$ are preferred based upon cost and commercial availability. The particle size of the magnetic particle can be varied to convenience so long as the formulated ferrofluid is stable (i.e., the magnetic particles remain uniformly suspended throughout the ferrofluid composition under conditions of use in well cementing and in the presence of a magnetic field). Magnetic materials with particle sizes of up to about 4000 Angstroms are presently preferred, based on commercial availability of such materials. Larger particle sizes and mixtures of particle sizes can also be used. The amount of magnetic material included in the ferrofluids can be varied, but generally amounts of up to about 20 weight percent are used, total weight basis.

A binding agent or surfactant is also used in the stable ferrofluid composition. The binding agent is preferably a synthetic polymer latex, and a styrene-butadiene polymer latex is most preferred. If a surfactant is chosen, any surfactant may be used which will keep the magnetic particles uniformly suspended in the cementitious ferrofluid composition and which does not adversely react with the hydraulic cement component. Normally, a non-ionic or anionic surfactant is used. Examples of such surfactants include: sulfonated aromatic polymers (e.g., naphthalene sulfonates, sulfonated polystyrenes, sulfonated polyvinyltoluenes, lignosulfonates, etc.); polyamines (e.g., polyalkylenepolyamines, polyethylenimines, etc.), polyvinylalcohols, and the like. The polymeric binding agents are presently preferred over the surfactants in formulating the cementitious ferrofluids.

Additives conventionally used in well cements can also be included in the present cementitious ferrofluids in conventional amounts so long as such additives do not affect the stability and performance of the cement slurry.

The liquid medium in the cementitious ferrofluids is normally an aqueous liquid. When Portland cement is utilized, water or water-alcohol solution are used and water is the preferred medium. The lower alkanols (e.g., methanol, ethanol, isopropanol, etc.) are occasionly used to enhance the solubility of organic additives in the cement slurry.

As noted above, conventional oilfield cement additives can be used herein. Such additives include: for example, fluid-loss additives, retarders, accelerators, extenders, lost circulation materials, weighting agents, gases, expansive agents, dispersants, surfactants, and the like, all of which are known classes of materials.

The cementitious ferrofluids are formulated by blending the components in appropriate amounts in any convenient manner. Normally, the magnetic particles are blended with the dry hydraulic cement and the dry blend is then added to the liquid medium containing the binding agent or surfactant with stirring or other mechanical means of agitation. If other additives are used, they are added to the cement slurry via conventional techniques. In well cementing, the cementitious ferrofluid will normally be prepared at the well site using conventional blending equipment to blend the solids and liquids together.

The spacer or chemical wash ferrofluids which are used herein are prepared by blending the magnetic particles, a stabilizing agent (bining agent or surfactant) and the spacer or chemical wash formation.

The novel well cementing process comprises the steps of:

(a) injecting the cementitious ferrofluid into the wellbore annulus separating a casing and the walls of a subterranean formation, and (b) applying a magnetic field to cause a mechnical response (e.g., movement) of the cementitious ferrofluid in the annulus before the cement slurry sets.

The cementitious ferrofluid can be injected into the annulus by any convenient technique, but most commonly the cementitious fluid will be pumped through the piping or casing to the bottom of the wellbore and then upwardly through the annulus separating the casing and the walls of the formation until the desired zone has been filled with cement slurry.

Alternatively, the spacer or chemical wash ferrofluid is injected through the casing to the bottom of the wellbore and upwardly through the annulus separating the casing and the walls of the formation to the zone to be treated, and the spacer or chemical wash ferrofluid is thereafter displaced by a conventional well cement or by the cementitious ferrofluid of the present invention.

In each instance, a magnetic field is applied to the spacer or chemical wash ferrofluid and/or the cementitious ferrofluid while it is in the zone to be cemented. The magnetic field applied may be a continuous or intermittent magnetic field strong enough to cause a mechanical response (e.g., movement) from the ferrofluid in situ. The response of the ferrofluid will thereby dislodge and displace residual drilling mud on the walls of the casing and/or the formation. Cement bonding to the casing and formation is thereby enhanced.

EXPERIMENTAL

All of the experimental slurries described below were prepared according to cement slurry preparation procedures recommended by the *American Petroleum Institute (API)* in API Spec 10, "API Specification for Materials and Testing for Well Cementing Second Edition, Section 5, pp. 16-17.

1. Class H Portland Cement (500 g), Dow Magnetic Latex #181 (magnetization: 130 gauss; 90 mL) and fresh water (110 mL) were blended together to form a homogeneous cement slurry. Upon placing a bar magnet made of samarium cobalt next to the glass beaker containing the slurry, the slurry moved as a unit toward the magnet. Upon continuous exposure to the magnetic field, no segregation of the magnetic latex from the cement matrix occurred. Therefore, the slurry is a stable cementitious ferrofluid which can be used in cementing wells, per the present invention.

2. Class H Portland Cement (400 g), gamma-$Fe_2O_3$ (Pfizer No. MO-2228; 40 g), polynapthalene sulfonate formaldehyde condensate (Dowell Schlumberger D65; 4 g), styrene-butadiene latex (Dowell Schlumberger D600; 20 mL), and fresh water (300 mL) were blended together to form a homogeneous cement slurry. Upon placing a samarium cobalt bar magnet next to the glass beaker containing the slurry, the slurry moved as a unit toward the magnet. Upon continuous exposure to the magnetic field, the gamma-$Fe_2O_3$ particles did not separate from the cement matrix. This system is also a stable cementitious ferrofluid useful in the present invention.

3. Class H Portland Cement (400 g), $CaSO_4 \cdot \frac{1}{2}H_2O$ (40 g), silica flour (140 g), polynapthalene sulfonate formaldehyde condensate (Dowell Schlumberger D65; 2 g), styrene-butadiene latex (Dowell Schlumberger D600; 8 mL), and water (309 mL) were blended together to form a homogeneous cement slurry. Upon placing a samarium cobalt bar magnet next to the glass beaker containing the slurry, the slurry moved as a unit toward the magnet. Upon continuous exposure to the magnetic field, the gamma-$Fe_2O_3$ particles did not separate from the cement matrix. This system is also a stable cementitious ferrofluid useful in the present invention. Note that this cement system is an "expanding cement" which expands after setting.

The following systems are non-cementitious ferrofluids and are "washines" or "spacer fluids", in a well cementing context. The API slurry preparation procedure applies for these fluids.

4. A commercial silicate-gel spacer concentrate (Spacer 1000 from Dowell Schlumberger; 64 g) was blended with gamma-$Fe_2O_3$ (61 g), and diluted with water (475 mL) to form an aqueous slurry. Upon placing a samarium cobalt bar magnet next to the glass beaker containing the slurry, the slurry moved as a unit toward the magnet. Upon continuous exposure to the magnetic field, the gamma-$Fe_2O_3$ particles did not separate from the matrix. This system is a stable ferrofluid and can be used as a spacer or wash in cementing wells.

5. A commercial cellulose-gel spacer concentrate (Spacer 3000 from Dowell Schlumberger; 50 g) was blended with barite (76 g), gamma-$Fe_2O_3$ (50 g), styrene-butadiene latex (Dowell Schlumberger D600; 4 mL) and 380 mL water to form a slurry. Upon placing a samarium cobalt bar magnet next to the glass beaker containing the slurry, the slurry will move as a unit toward the magnet. Upon continuous exposure to the magnetic field, the gamma-$Fe_2O_3$ particles did not separate from the matrix. This system is a stable ferrofluid and can be used as a spacer or wash in cementing wells.

What is claimed is:

1. A method of preparing a well for cementing comprising:
   (a) injecting into the annulus separating a casing and the formation a stable ferrofluid comprising an aqueous spacer or wash containing finely divided magnetic particles, and a binding agent or surfactant in an amount sufficient to render the composition stable in a magnetic field, and
   (b) applying a magnetic field to cause a mechanical response of said ferrofluid in the annulus.

2. A method of cementing a well comprising the steps of:
   (a) injecting a stable ferrofluid into the annulus separating a casing and a subterranean formation wherein said ferrofluid comprises an aqueous spacer or wash containing finely divided magnetic particles, and a binding agent or surfactant in an amount sufficient to render the composition stable in a magnetic field, and
   (b) applying a magnetic field to cause a mechanical response of said stable ferrofluid in the annulus, and
   (c) displacing said ferrofluid with an aqueous hydraulic cement.

3. A method of cementing a well comprising the steps of:
   (a) injecting a stable ferrofluid into the annulus separating a casing and a subterranean formation wherein said ferrofluid comprises an aqueous spacer or wash containing finely divided magnetic particles and a binding agent or surfactant in an amount sufficient to render the composition stable in a magnetic field, and,
   (b) applying a magnetic field to cause a mechanical response of said stable ferrofluid in the annulus, and
   (c) displacing said stable ferrofluid with a stable cementitious ferrofluid comprising: (i) a hydraulic cement, (ii) finely divided magnetic particles, (iii) a binding agent or a surfactant, and (iv) a liquid medium, said binding agent or surfactant being present in an amount sufficient to render the composition stable in a magnetic field.

* * * * *